E. RIVEROLL.
METHOD OF AND APPARATUS FOR THE PRODUCTION OF IRON AND STEEL.
APPLICATION FILED MAY 12, 1919.
1,370,915.
Patented Mar. 8, 1921.
2 SHEETS—SHEET 1.
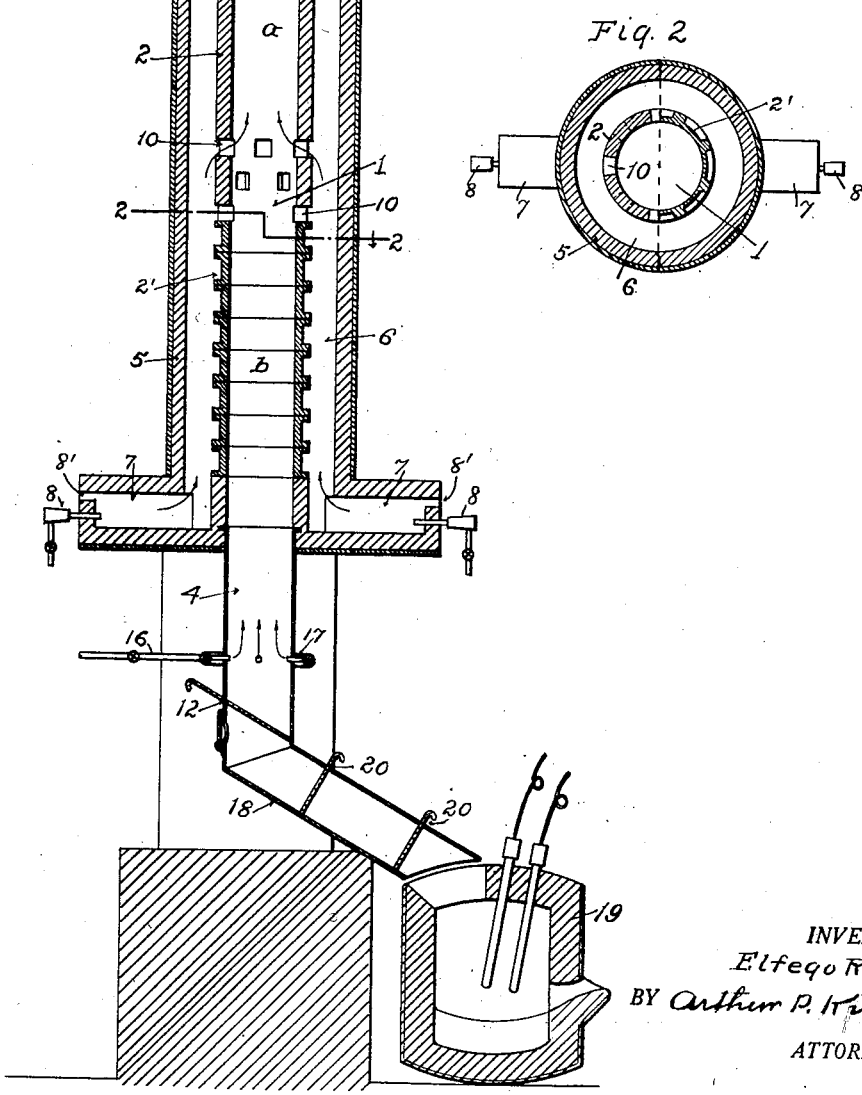
INVENTOR.
Elfego Riveroll
BY Arthur P. Knight
ATTORNEY

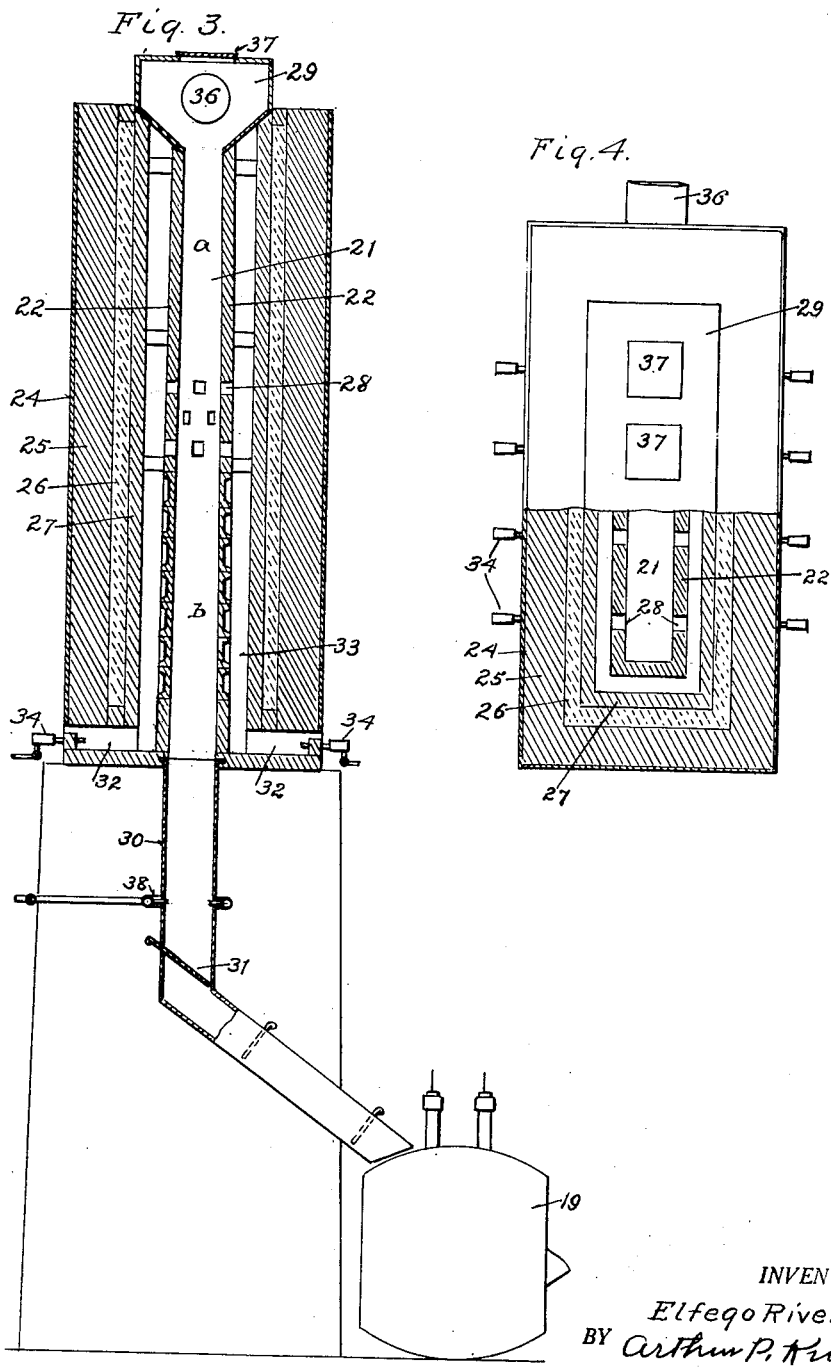

UNITED STATES PATENT OFFICE.

ELFEGO RIVEROLL, OF LOS ANGELES, CALIFORNIA, ASSIGNOR TO CALIFORNIA ELECTRIC STEEL COMPANY, OF LOS ANGELES, CALIFORNIA, A CORPORATION OF CALIFORNIA.

METHOD OF AND APPARATUS FOR THE PRODUCTION OF IRON AND STEEL.

1,370,915.  Specification of Letters Patent.  Patented Mar. 8, 1921.

Application filed May 12, 1919. Serial No. 296,336.

*To all whom it may concern:*

Be it known that I, ELFEGO RIVEROLL, a citizen of the United States, residing at Los Angeles, in the county of Los Angeles and State of California, have invented a new and useful Method of and Apparatus for the Production of Iron and Steel, of which the following is the specification.

This invention relates to the art of producing iron and steel from ores thereof, and the main object of the invention is to provide for such production at minimum expense for fuel and for operation and maintenance of the necessary plant.

A further object of the invention is to provide an apparatus and process for the purpose above stated, which are especially adapted for the utilization of hydrocarbon fuels, particularly hydrocarbon gas. In this connection, an important feature of the invention is its applicability to the production of iron and steel in localities where oil fuel or natural gas are relatively abundant and coke is relatively expensive and, in this connection, an important feature of the invention is the reduction to a minimum of the amount of coke necessary for carrying out the operation.

My improved process is based on a primary reduction at comparatively low temperature, in which a large portion of the iron content of the ore is reduced to a metallic state in the form of sponge, which is subsequently heated sufficiently to fuse the iron. In operations of this kind, as heretofore carried out, it has been attempted to effect substantially complete reduction of the iron in the formation of iron sponge and such attempts have heretofore been commercially unsuccessful, mainly for the reason that the substantially complete reduction of the ore to metallic iron in the form of sponge involves such prolonged heating and such an excessive amount of fuel as to render the process commercially impracticable on account of the cost of fuel and the small capacity of the plant, with attendant excessive overhead charges per ton of metal produced.

I have found that the process of iron or steel production by the formation of sponge, followed by fusion, can be expedited to such an extent as to make it commercially practicable by carrying out the operation in the following manner: first, preheating the ore by the heat of waste gases until it reaches substantially the temperature required for the primary reduction; second, subjecting the ore thus heated to the action of reducing gas in such manner as to reduce a considerable proportion, but not substantially all, of the iron to the metallic state in the form of sponge; third, heating the incoming reducing gas by contact with the sponge in such manner as to cool the sponge; the reducing gas applied in contact with the sponge in the cooling and reducing operations being of such character as to carburize the sponge sufficiently for the next succeeding operation; fourth, heating the sponge so produced to a sufficient temperature to cause fusion of the iron therein and reaction of the carburized portion of the sponge with the unreduced portion of iron ore in such manner as to effect the recovery in the form of metallic iron of approximately the entire iron content of the ore.

In carrying out the above described operation more or less coke or similar solid carbonaceous fuel may be applied to or mixed with the ore charge but the main reducing and carburizing actions are preferably effected by the use of a hydrocarbon gas, or, at least, of an enriched reducing gas. More or less coke, or other solid carbonaceous material, may also be used in the final smelting operation along with suitable fluxes, such as lime.

The accompanying drawings illustrate apparatus suitable for carrying out my invention, and referring thereto:

Figure 1 is a vertical section of one form of the apparatus.

Fig. 2 is a section on line 2—2 in Fig. 1.

Fig. 3 is a vertical section of another form of the apparatus.

Fig. 4 is a partly sectional plan view thereof.

The apparatus shown in Fig. 1 comprises an ore receptacle 1, whose walls 2 are preferably of heat resisting material, such as fire-brick, said receptacle being shown as a cylindrical shaft communicating at its upper end at a stack or outlet flue 3 and at its lower end with a cooling chamber 4. The bricks at the lower part of walls 2 are preferably countersunk or provided with relatively thin web portions 2' to facilitate the transfer of heat therethrough, these countersunk parts being on the outside so as to leave the inner surfaces smooth to minimize resistance to the descent of the ore. A brick wall 5 surrounds the receptacle 1 in such manner as to form a space 6 between the walls 2 and 5 for the reception of the heating medium, this space communicating with suitable heating means, for example, fireboxes or combustion chambers 7, opening into said space 6 at the lower end thereof, and provided with suitable means, such as burners 8 for the combustion of any suitable fuel, such as producer gas, natural gas, or liquid hydrocarbon. Said combustion chamber is constructed for admission of sufficient air for the combustion of such fuel, either at the burner or adjacent thereto, as indicated by openings 8'. The ore receptacle 1 is preferably of considerable height so as to form an ore body of sufficient vertical length to maintain the ore for the required time in contact with the gases in the preheating and reducing zones, as hereinafter described, and the wall 2 of said ore receptacle is provided intermediate between its lower and upper ends with openings or passages 10 for communication of the hot gases or products of combustion from the space 6 to the interior of said ore receptacle. That portion $a$ of the ore receptacle 2 which extends from the top of said receptacle to the lowermost opening 10 constitutes a preheating zone or chamber; the portion $b$ of the ore receptacle 2 which extends from the lowermost opening 10 to about the lower limit of the combustion chambers 7 constitutes a reducing zone or chamber; and the cooling chamber 4 extending downwardly from the ore receptacle, and forming a vertical continuation thereof, constitutes a cooling zone. This cooling chamber 4 may be formed of sheet metal casing and is provided at its lower end with a suitable gate or discharge means 12 for the iron sponge. The stack or outlet flue 3 is provided with a charging opening 13 through which ore may be charged into the furnace from a suitable platform 14, or other supply means. Pipe connections 16 and 17 are provided for leading reducing gas to the cooling chamber 4. A chute 18, or other means, leads from the discharge gate 12 to a smelting furnace of any kind, for example, an electric furnace 19, of any suitable construction. Said chute may have gates 20 for storing the sponge temporarily in batches sufficient for one charge for the electric furnace.

My process is applied to any oxidized ore of iron, either a naturally oxidized ore, such as hematite, or a roasted sulfide ore. The charge supplied to the furnace may consist of iron ore, crushed to about two and one-half inch size, mixed about three to ten percent. of coke, crushed to about the same size, and with, say, about three per cent. of burnt lime. The lime hastens reduction and also serves as a flux in the subsequent melting operation. It is not desirable to use lime rock, as the absorption of heat in driving off $CO_2$ therefrom unduly lowers the temperature in the reducing zone.

My improved process may be carried out in the above described apparatus in the following manner:

Coke of a suitable size may first be charged into the ore receptacle so as to substantially fill the cooling chamber or zone 4 and the charge of ore, preferably an oxid or oxidized ore of iron mixed with a small proportion of coke and lime, as stated, is charged into the tower to fill the reducing zone or chamber $b$ and also the preheating zone or chamber $a$. Gaseous or liquid fuel, preferably hydrocarbon fuel, is then supplied at the burners 8 and burns in the combustion chambers 7, the hot gases or products of combustion passing upwardly in the spaces 6 around the wall 5 of the reducing chamber or zone 6 and then through the openings 10 into the preheating chamber or zone $a$, so that these hot products of combustion first heat the reducing zone by indirect heating by conduction of heat through the wall of the reducing chamber and then heat the ore directly by passing upwardly through the same in the preheating zone, the waste gases finally passing out at the outlet flue or stack 3 after having the required amount of heat abstracted therefrom. When the ore in the reducing and preheating zone has been heated sufficiently in this manner the charge of coke at the bottom of the tower is withdrawn by opening the gate 12 so as to allow the charge of ore to descend into the cooling zone or chamber 4 and the operation may then proceed by successive advances of the ore. A desirable method of operation is to withdraw from time to time a certain portion of the product at the discharge gate 12, and allow the whole body of material to descend accordingly. The amount so withdrawn at each discharging operation may be any amount up to the capacity of the reducing zone. In this operation the ore is gradually heated and reduction started as it passes down through or is retained in the preheating zone by contact with the hot gases therewith, so that by the time it reaches the top of the reducing zone *b* it is at substantially the temperature required for additional reducing action. As the ore then passes through or is retained in the reducing zone, it is brought into contact with the hydrocarbon vapor or gas supplied through pipes 16 and 17 and heated by contact with the product in the cooling chamber 4, with the result that a considerable proportion, but not substantially all, of the iron oxid in the ore is reduced to a metallic condition in the form of sponge and carburized.

In carrying out this operation to the best advantage it is desirable to maintain the temperature of the ore or charge in the reducing zone at about 800° C. A lower temperature than this requires too long a time for the reducing operation and a higher temperature is objectionable, not only on account of excessive amount of fuel required, but on account of the tendency to reoxidize at such higher temperature by contact of the metallic iron with the carbon dioxid. It is to be understood that at this temperature there is little, if any, tendency to fusion of the charge, so that the charge is kept in open condition, suitable for passage of the vapor and gases therethrough.

In carrying out this process the ore is preferably charged in comparatively coarse condition, say about two and one-half inch size, thereby reducing the resistance to the passage of the gas therethrough and obviating the liability of "channeling," such as occurs when the ore is supplied in finely crushed condition. By retaining the charge in the reducing zone for a period of say 5 or 6 hours, approximately seventy-five per cent. of the iron content of the ore may be reduced to metallic condition, the remaining twenty-five per cent. being still in the form of oxid. By reason of the contact of the hydrocarbon gas or vapor with the reduced iron in spongy condition thus produced, there is more or less carburizing of such iron, this carburizing taking place after the iron is reduced to a spongy condition. As the ore passes down into the cooling zone or chamber 4 it meets the incoming hydrocarbon gas or vapor from the pipes 16, so as to heat said vapor by the heat of the sponge and at the same time cooling the sponge so when the sponge is finally discharged at the gates 12 it is sufficiently cool to prevent reoxidization by contact with the air, provided that reasonable precautions as to prolonged exposure of the spongy iron to atmospheric air are observed. As the hydrocarbon gas or vapor is heated in this manner by contact with the hot fuel, more or less decomposition of the hydrocarbon takes place, resulting in reaction of the carbon of such fuel with the reduced metal to carburize the latter and the operation is so carried out that the amount of carbon taken up by the iron is at least sufficient to react (in the ensuing melting operation) with substantially all of the oxid remaining in the ore charge to reduce the same to metallic iron. In general, it is desirable to provide for an excess of carbon over the amount required for this purpose so as to produce more or less carburization of the final product. To insure this, and also to aid in the reducing and carburizing actions, more or less solid carbonaceous material, for example, crushed coke, up to say three to ten per cent. of the weight of the charge, may be mixed with the charge as it is fed into the preheating zone. This coke, which is preferably crushed to about the same size as the ore and is thoroughly intermixed with the ore, also acts to keep the bed or charge open, enables more uniform distribution of the gases, obviates the necessity of the use of high pressure or forced draft, and prevents "channeling" of the ore bed.

Reduction in the preheating zone is mainly by carbon monoxid produced from the coke. The hot gases ascending through the reducing zone contain CO and $CO_2$ and the $CO_2$ is largely reduced to CO by contact with the coke and the carbon monoxid so produced is utilized in a primary reduction of the ore. This primary reduction consists mainly in reducing $Fe_2O_3$ to $Fe_3O_4$ and FeO. In the reducing zone the reduction is carried further to produce FeO and Fe, so that the unreduced oxid in the sponge is mainly in the form of FeO.

Samples of the sponge produced according to this process have given the following analyses:

| | | |
|---|---:|---:|
| FeO | 37.48 | 18.54 |
| Fe | 42.40 | 59.32 |
| C | 7.67 | 1.67 |

From the discharge gate 12 the sponge iron passes to the electrical or other melting furnace 19, while still hot, the retention of the sponge by the gates 20 being only for sufficient time to hold the product until the melting furnace is ready for same. In this melting furnace the sponge iron is raised by electrically produced heat, or otherwise, to a sufficiently high temperature to melt the sponge and cause the carbon in the carburized portion thereof to react with the unreduced ore portion to produce substantially complete reduction to metallic iron of the total ore content. It will be understood that this melting operation may be varied according to the product desired, suitable steel constituents, such as manganese, silicon, etc., being added to the charge in the melting furnace to produce any special kind of steel, and the carbon content can be increased by adding carbon or decreased by permitting the carbon to consume, according to requirements.

The following is the analysis of a steel ingot produced by the melting furnace from sponge produced according to my process:

| | |
|---|---|
| Graphitic carbon | .120 |
| Combined carbon | 2.750 |
| Manganese | .150 |
| Phosphorus | .012 |
| Sulfur | .039 |
| Silicon | .183 |

Other ingots showed, respectively, 1.7 and 1.96 carbon and 4.7 and .268 silicon. The slag from the melting furnace contained, according to analysis, 1.62% combined iron (as FeO) and 2% metallic iron (disseminated as "shot iron").

As indicating the value of the above described operation of producing a sponge in which the ore is only partly reduced but containing enough free carbon to complete the reduction in the final melt, it may be stated that the complete operation of this process, including the final melt, may be effected in about ten hours, as compared with about 75 hours for a process of substantially complete reduction of the sponge followed by melting.

In the form of the invention shown in Figs. 1 and 2 the ore receptable is cylindrical or tubular but it is to be understood that my invention is not limited to any specific shape of this receptacle, or of the parts connected therewith, for example, in Figs. 3 and 4 an ore receptacle is shown as a rectangular chamber which is elongated in one direction so as to give increased capacity but is relatively narrow in a transverse direction, so as to enable penetration of heat from the space containing the heated products of combustion through the walls of the receptacle and into the body of ore therein. In this form of the invention the ore receptacle 21 is formed with side walls 22, which preferably converge slightly toward their upper end so as to enable free movement of the ore downwardly therein. The ore receptacle in this case is surrounded by an outer wall, consisting, for example, of a sheet iron casing or jacket 24, a brick wall 25 within the same, a heat insulating layer 26 of suitable insulating material, such as diatomaceous earth, and an inner lining 27 of fire brick. Openings 28 are provided at suitable intervals in the walls 22 of the ore receptacle, above the reducing zone $b$. The ore receptacle 21 opens at its upper end into a hopper 29 communicating with an outlet flue 36 and having suitable charging doors 37 for supplying the ore to the receptacle. The receptacle 21 communicates at its lower end with a cooling chamber 30, formed, for example, of sheet metal, and provided with a discharge gate 31 and with supply means 38 for reducing gas, such as hydrocarbon gas. Combustion chambers 32 are provided in the walls 25 and communicate with the space 33 between the linings 27 and the walls 22 of the ore receptacle, said combustion chambers being provided with any suitable means, such as burners 34 for supplying suitable fuel thereto. An electric, or other suitable melting furnace 19 is also provided in connection with the reducing furnace and the operation of the apparatus is substantially as described in connection with the apparatus shown in Fig. 1. In this form of the apparatus, as shown in Fig. 3, the walls of the reducing zone are formed of countersunk brick as in Fig. 1.

With either form of the apparatus described, the heat of the outgoing gases is mostly given up to the incoming ore, and, on the other hand, the outgoing sponge product gives up its heat mostly to the incoming reducing gas. In view of this heat regenerative action and of the heat insulation of the apparatus so that but little heat can escape through the walls, minimum loss of heat and maximum efficiency of operation are secured.

What I claim is:

1. The process of producing iron or steel from iron ores, which consists in subjecting said ores to the action of a reducing and carburizing gas at such temperature and for such time as to reduce a portion of the iron in the ore to metallic condition to form sponge iron while leaving another portion of the iron unreduced to metallic condition, and to carburize such sponge iron, and subsequently heating the mixture of the unreduced iron ore and of carburized sponge iron sufficiently to cause reduction of the unreduced ore by reaction with the carburized iron sponge and fusion of the resulting metallic iron.

2. A process, as set forth in claim 1, comprising the addition of suitable steel constituents to the sponge before or during the fusion of the sponge.

3. The process, which consists in passing a body of iron ore mixed with carbonaceous material, downward through a preheating zone and into a reducing zone, and passing the product from the reducing zone into a cooling zone, passing a hydrocarbon-bearing reducing gas upward through said cooling and reducing zones successively to first cool the sponge product in the cooling zone, and to be heated by such product, and to then partially reduce and carburize the ore in the reducing zone to produce partially reduced and carburized sponge product, passing hot gases resulting from combustion of carbonaceous material in heat conducting relation to the material in the reducing zone to heat the same by conduction, then passing such hot gases, together with gases from the reducing zone, through the body of material in the preheating zone to preheat and partially reduce the iron ore therein; and fusing the sponge from the cooling zone to cause reaction of the unreduced portion thereof with the carbon contained in the sponge to form a steel or iron product.

4. In the manufacture of iron and steel, the process of producing sponge iron, which consists in passing an ore charge, including divided ore material, successively through preheating, reducing and cooling zones, causing hot gases resulting from combustion of carbonaceous material externally to said zones to pass in heat conducting relation to the ore material in the reducing zone, to heat the same by conduction, and through the body of ore material in the preheating zone to heat the same by contact, causing a hydrocarbon-bearing reducing gas to pass first in contact with the ore material in the cooling zone, to preheat said gas and to cool the sponge produced in the reducing zone, then in contact with the ore material in the reducing zone, and then in contact with the ore material in the preheating zone, in such manner that reduction of part of the iron content of the ore to sponge and carburizing of such sponge is effected while leaving another part of the iron content of the ore unreduced to metallic condition.

5. A process, as set forth in claim 4, wherein said ore charge contains divided solid carbonaceous material mixed with the ore, to aid in keeping the bed of ore material open and to aid in reduction of the iron.

6. An apparatus for the production of iron sponge from iron ore, comprising a vertical ore receptacle having a charging opening and an outlet for gases at its upper end, the lower part of said receptacle forming a reducing zone, and the upper part of said receptacle forming a preheating zone, and a heating chamber surrounding said ore receptacle, a combustion chamber communicating with the lower part of said heating chamber for supplying hot gases to said chamber to heat the contents of the reducing zone by conduction through the wall thereof, said ore receptacle having openings in its wall above the reducing zone and communicating with said heating chamber to enable the hot gases therefrom to pass into the preheating zone, a cooling chamber below said ore receptacle and forming a downward extension thereof, and provided at its lower end with a discharge gate, and means for supplying reducing gas to said cooling chamber in such manner that said gas is heated by the product in said chamber and is passed into the reducing zone.

In testimony whereof I have hereunto subscribed my name this 2nd day of May, 1919.

ELFEGO RIVEROLL.